United States Patent
Perkins

(10) Patent No.: US 9,003,628 B2
(45) Date of Patent: Apr. 14, 2015

(54) ROOF TRIM DITCH MOLDING FITTING TOOL

(75) Inventor: Blair Perkins, Georgetown, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 541 days.

(21) Appl. No.: 13/352,906

(22) Filed: Jan. 18, 2012

(65) Prior Publication Data

US 2013/0180102 A1 Jul. 18, 2013

(51) Int. Cl.
*B23P 19/02* (2006.01)
*B23P 19/04* (2006.01)

(52) U.S. Cl.
CPC ............... *B23P 19/047* (2013.01); *Y10T 29/53* (2015.01)

(58) Field of Classification Search
CPC . B60J 10/0088; B23P 19/047; B25B 27/0092
USPC ............. 29/235, 700, 451; 15/DIG. 2; 34/666
See application file for complete search history.

(56) References Cited

U.S. PATENT DOCUMENTS

| | | | |
|---|---|---|---|
| 4,620,354 A | 11/1986 | Hess et al. | |
| 4,760,636 A | 8/1988 | St. Angelo, Jr. et al. | |
| 4,834,448 A | 5/1989 | Sakamoto et al. | |
| 5,029,381 A | 7/1991 | St. Angelo, Jr. et al. | |
| 5,067,225 A | 11/1991 | St. Angelo, Jr. et al. | |
| 5,121,532 A | 6/1992 | Massie | |
| 5,201,106 A | 4/1993 | Moore et al. | |
| 5,237,730 A | 8/1993 | Goedderz | |
| 5,237,741 A | 8/1993 | Goedderz | |
| 5,755,043 A * | 5/1998 | Belanger et al. | 34/666 |
| 6,832,428 B2 | 12/2004 | Miura et al. | |
| 7,368,074 B2 | 5/2008 | Omori et al. | |
| 7,621,574 B2 | 11/2009 | Mourou et al. | |

FOREIGN PATENT DOCUMENTS

JP          7223566 A          8/1995

OTHER PUBLICATIONS

R. P. Gatta, Inc. Roof Ditch Roll Down (Wet Out) Systems. Retrieved from http://www.rpgatta.com/RoofDitch2.htm on Oct. 18, 2011.

* cited by examiner

*Primary Examiner* — Lee D Wilson
*Assistant Examiner* — Jamal Daniel
(74) *Attorney, Agent, or Firm* — Christopher G. Darrow; Young Basile Hanion & MacFarlane P.C.

(57) ABSTRACT

A system for securing moldings to associated roof ditches of a vehicle moving down an assembly line. The system comprises a plurality of rollers coupled to a plurality of lift booms. The lift booms include suitable means for raising and lowering the lift booms relative to an associated vehicle roof surface as well as means for permitting the lift boom to free float during at least a portion of an application cycle. The lift boom also has weights affixed to the lift boom proximate to the rollers with gravity producing force necessary to adhere the molding to the vehicle.

17 Claims, 2 Drawing Sheets

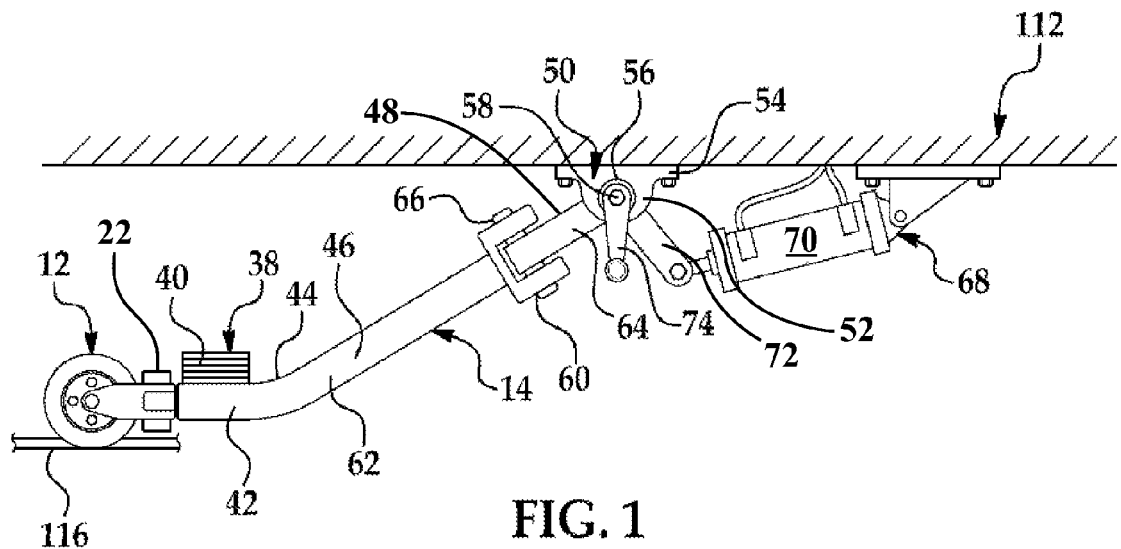
FIG. 1
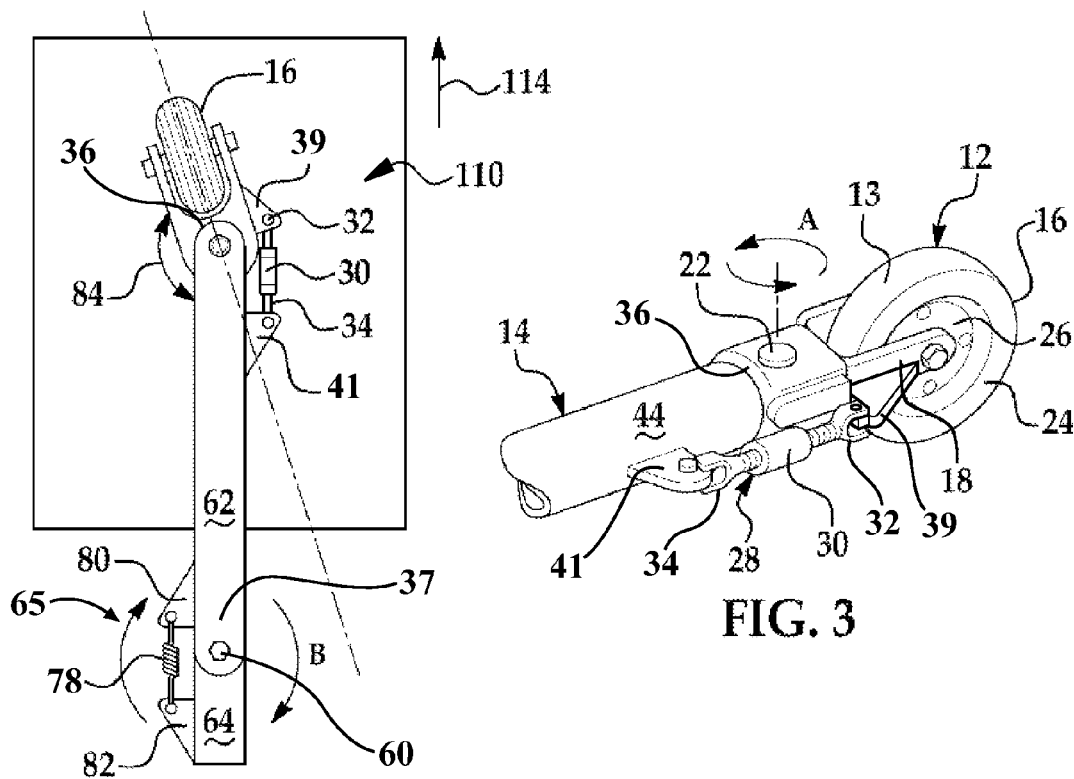
FIG. 2
FIG. 3

ROOF TRIM DITCH MOLDING FITTING TOOL

BACKGROUND

The present invention generally relates to devices for fitting finish moldings into position in overlying relationship to joints between outer panels such on a vehicle such as fitting trim moldings in the vehicle ditches.

Various automotive vehicles are assembled with seams or junctions between the various body panel members. For example, the connection between the roof panel member and associated vehicle side panel members can be formed as a depression associated with the joint commonly referred to as a roof ditch. The roof ditch can be covered by a suitable molding in the finished vehicle to prevent accumulation of fluids and debris and to provide an aesthetically pleasing surface. In various vehicle models, the roof ditch and associated molding can curve according to vehicle contour.

The process of attachment or securing the molding to the associated roof ditch requires that adhesive on the trim molding be "wetted out" as the vehicle travels down the assembly line. In the process of wetting out, adhesive present on the interior-facing surface of the molding strip sets to achieve a secure bond between the molding strip and the associated vehicle surface. Inadequate or incomplete wetting out can result in improper attachment between the molding and the roof ditch. In order to ensure proper wetting out, the molding is currently attached using manual methods.

It would be desirable to provide a system that would provide effective wetting out or adhesion for curved molding applied to roof contours having various contours such as a curved radius. It would also be desirable to provide an automated method and system that can secure curved moldings to associated roof ditch while the vehicle moves down an assembly line. It would also be desirable to provide a method and system that would follow the surface of the molding to be applied in a manner that would minimize potential for scuffing or abrading the surrounding surface finish on the associated vehicle.

SUMMARY

Disclosed herein is a system for securing moldings to the roof ditch of a vehicle moving down an assembly line in a line of forward travel. The system comprises at least one lift boom with at least one roller connected to a first end of the lift boom. The roller member is configured to engage an outwardly oriented surface of a molding positioned in the roof ditch of the vehicle. The system also includes means for raising and lowering the lift boom relative to a roof surface of the associated vehicle. The raising and lowering means operative on the lift boom at a location distal to the roller member. The system also includes means for permitting the lift boom to free float relative to the raising and lowering means during at least a portion of the molding cycle.

The system can be included in an assembly system that includes a support member having at least two upright supports and a central bean defining a central opening configure to overly and surround the vehicle moving down the assembly line with one or more application systems mounted on the support member.

DESCRIPTION OF THE DRAWINGS

In order to facilitate the present disclosure, reference is made to the following illustrative drawing figures in which like reference numerals are employed where appropriate throughout the various views:

FIG. 1 is a side view of a lift boom assembly according to an embodiment disclosed herein;

FIG. 2 is a top view of an embodiment of a roller member and associated lift boom as disclosed herein;

FIG. 3 is a detail view of an embodiment of a roller member of FIG. 1;

DETAILED DESCRIPTION

Figure 4:
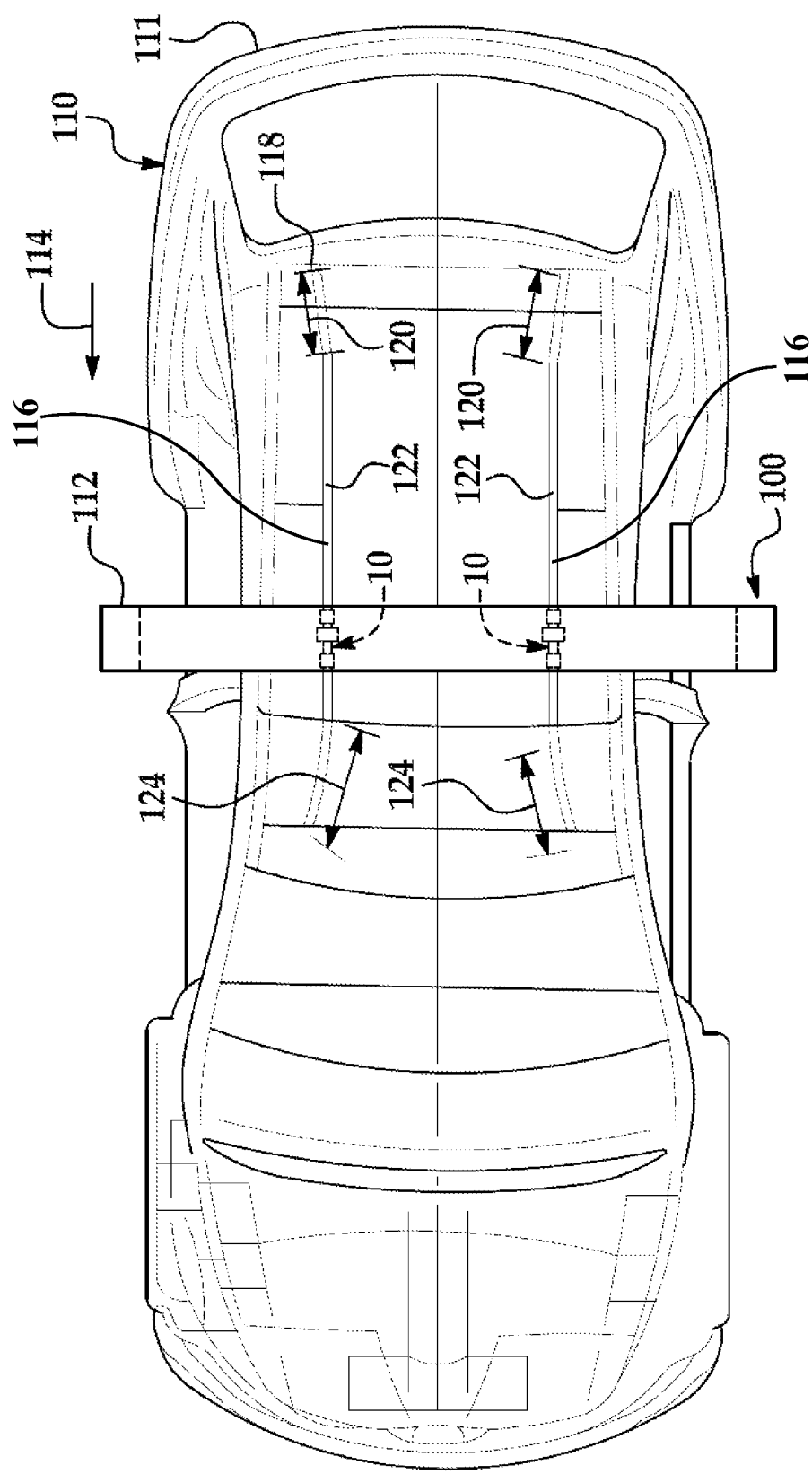
FIG. 4 is an upper plan view of an embodiment of a roof ditch molding system as disclosed herein.

The present disclosure relates to a system for securing a molding to a roof ditch of a vehicle moving down a vehicle assembly line. The system comprises at least one roller coupled to a lift boom. The lift boom includes suitable means for raising and lowering the lift boom relative to an associated vehicle roof surface. Also included are means for permitting the lift boom to float free during at least a portion of a molding application cycle. The lift boom also includes weights that are affixed to the lift boom body proximate to the roller. The weights are configured to provide a gravity producing force sufficient to adhere the molding to the vehicle. The rollers are configured and oriented to follow the molding along vehicle curvature while the moves down the conveyor line.

The system can include multiple suitable roller-lift boom configurations that can be mounted on a suitable support member. In various embodiments, the roller-lift boom configurations are suspended from the support member to contact the automotive vehicles as each vehicle moves down the conveyor line.

In the embodiment depicted in the various drawing figures, the system 10 has at least one roller 12 coupled to a lift boom 14 at a first or proximate end. The roller 12 can have a suitable outer radial surface 13 having an outer geometry configured to correspond to outer surface of a molding strip such as molding strip 116 as seen in FIGS. 1 and 4. The outer radial surface 13 of roller 12 will be of sufficient width to overlie the corresponding outer surface of the molding 116 as the roller 12 is conveyed over it. In various embodiments, it is contemplated that the width and contour of the outer radial surface 13 of roller 12 will correspond to the width and outer surface of the molding with essentially no contact or overlap with the roof surface of vehicle 110 located proximate to the roof ditch and molding 116 being applied to it. For purposes of this disclosure, such engagement is defined as a direct overlying manner.

The roller 12 can be coupled to the lift boom 14 in any suitable manner. In the embodiment depicted in the drawing, the roller 12 is pivotally attached to the lift boom 14 by any suitable means. The roller 12 can be attached to the lift boom 14 in a manner such that the roller 12 can pivot relative to the lift boom 14 defining an arc A. In the embodiment depicted, arc A can be parallel to the roof surface of the associated vehicle 110 when the system 10 is in the use position.

The roller 12 may have any suitable configuration. The outer radial surface 13 of the roller 12 can be configured to engage the surface of the associated molding 116 in a manner that transfers sufficient downwardly oriented force to the molding 116 in a manner that activates or "wets out" the underlying adhesive to achieve bonding of the molding 116 to the associated roof ditch. The configuration of the outer radial surface 13 of the roller 12 can be configured to conform to the surface of the associated molding 116 if desired or required. Non-limiting examples of surface configurations for the outer radial surface 13 of the roller 12 include a generally flat surface as depicted in FIG. 3 or a more contoured surface as depicted in FIG. 2.

The roller 12 can be configured such that the outer radial surface 13 or tread will be composed of a flexibly resilient material. Non-limiting examples of flexibly resilient materials include such as polyurethanes and the like. The flexible resilient material can be deployed so that the roller 12 is composed of a skin of polyurethane with an underlying wheel 16 base composed of a more rigid material. Alternately, it is contemplated that the wheel 16 itself can also be composed of the flexibly resilient material. The flexibly resilient material employed can be one that reduces or eliminates scuffing or scarring of vehicle surface finish proximate to the roof ditch and molding 116. Without being bound to any theory, it is also believed that the flexibly resilient material will increase tractive force between the molding 116 and the associated roller 12 in a manner that helps maintain the roller 12 in operative engagement with the molding 116 during the application cycle.

In the embodiment depicted in the various drawing figures, the roller 12 can include a suitable wheel member 16 rotatably mounted in a suitable clevis 18. The clevis 18 can be connected to a first end 36 of the lift boom 14 by any suitable pivotal attachment device 22. In certain specific embodiments, the wheel member 16 can be composed of an outer tire member 24 mounted on a suitable central rim 26. The outer tire member 24 can be composed of a suitable resilient material such as various polyurethanes. The central rim 26 is rotatably mounted in the clevis 18 using a suitable axel such that the plane of axial rotation of the wheel member 16 is perpendicular to the pivotal arc A.

The system 10 can also include means 28 for controlling or limiting the pivotal travel of the roller 12 relative to the lift boom 14. The pivot limiting means 28 can be configured to permit the lift boom 14 to track a clockwise or counterclockwise relative to the path of travel as desired or required. The pivot limiting means 28 is configured to adjust the steering angle S of the system 10 in any suitable manner. In the embodiment depicted, the pivot limiting means 28 is a suitable turnbuckle member 30 having a first end 32 connected to the clevis and a second end 34 connected to the lift boom 14 at a location proximate to the first end 36 of the lift boom 14. The turnbuckle member 30 can be connected at its first and second ends to brackets 39, 41 attached the clevis 18 and lift boom 14 respectively. The turnbuckle member 30 can be adjusted to maintain the angular relationship between the lift boom 14 and the roller 12 based the specific radius path R. Radius path R can have a configuration that is defined by the roof ditch of the associated vehicle.

The lift boom 14 can define a central axis that extends from the first end 36 of the lift boom 14 through to a second point 37 remote from the first end 36. Adjustment of the turnbuckle member 30 accomplishes a desired angular orientation of the roller 12 (right or left) relative to the central axis and relative to the direction of forward travel of the associated vehicle 110. By adjusting the angular orientation of the roller 12, if the lift boom 14 is allowed rotational freedom, rotation of the lift boom 14 will occur until the wheel angle and the line direction angle defined by the direction of travel are equal (parallel).

The lift boom 14 also includes suitable means 38 for transferring pressure to the rollers 12 to the associated molding 116. In various embodiments, it is contemplated that the lift boom 14 can be configured to utilize the force of gravity to transfer pressure to the associated roller 12. In the embodiment depicted, the pressure transferring means 38 can be composed of suitable weight member(s) 40 that are associated with the lift boom 14 at a location that is suitable to provide downward pressure via gravity when the associated system 10 is oriented in its use position. The weight member(s) 40 can have any configuration suitable to maintain the weight member 40 in contact with the lift boom 14 and exert force on the molding 116. It is contemplated that the force transferring means 38 can include a suitable force adjustment devices as desired or required. Non-limiting examples of force adjustment can include a pressure transferring means 38 can be composed of a plurality of weights that can be added or removed as required to produce the appropriate force through the roller 12. It is also contemplated that the location of the pressure transferring means 38 such as weight member(s) can be adjusted relative to the lift boom 14 to modify the value of the force exerted.

The region of the lift boom 14 proximate to the roller 12 can be configured to accommodate the weight member 40. In the embodiment depicted in the various drawing figures, the region of the lift boom 14 proximate to the roller 12 includes outer arm member 42 that defines a plane parallel to the surface of the associated vehicle 110 when the system 10 is in the use position. Weight member 40 can rest on an upper surface 44 of the outer arm member 42.

The lift boom 14 can also include a central arm member 46 contiguously connected to the outer arm member 42 and extending angularly away from the outer arm member 42 and the associated roller 12 such that the weight member 40 is positioned proximate to the interior acute angle defined by the junction of the outer arm member 42 and the central arm member 46.

The lift boom 14 also has a second or terminal end 48 distal to the outer arm member 42 and to the roller 12. In the embodiment depicted in the drawing figures, the second or terminal end 48 pivotally engages a suitable associated support or mounting surface such as mounting member 112. The terminal end 48 of the lift boom 14 can be configured to pivotally engage an associated mounting bracket 50. The mounting bracket 50 can include a pair of opposed walls 52 projecting outward from an associated base 54 with each opposed wall 52 having an aperture 56 defined therein. The terminal end 48 of the lift boom 14 can be configured with at suitable through shaft positioned coaxial with the apertures 56 located in the opposed walls 52 of the mounting bracket 50 when in the operative position and can be held in operative position by a suitable throughpin 58.

The lift boom 14 can also include means for accomplishing lateral pivotal movement of the roller 12 relative to the line of forward travel 114 of the associated vehicle 110. This can be accomplished by means of a pivotal articulation joint positioned at a location between the first and second ends of the lift boom 14. The articulation joint can be configured to facilitate pivotal movement of the roller 12 and contiguous region of the lift boom 14 that is depicted in the various embodiments as outer arm 42.

In the embodiment depicted in the drawing figures, the lift boom 14 includes a central pivot member 60 as the central articulation joint. The central pivot member 60 is located in the central arm member 46 dividing the central arm member 46 into a lower central arm member 62 and an upper central arm member 64. Central pivot member 60 can be configured in any suitable manner. In the embodiment depicted in FIG. 1, the central pivot member 60 is composed of a pivot bracket member 66 that joins and engages upper and lower central arm members 62, 64. The bracket member 66 is oriented relative to the lift boom 14 in an orientation that permits the roller 12 to travel left or right relative to the direction of vehicle travel 114. The scope of roller travel can be controlled and limited as desired or required as by suitable biasing means 65 such as spring 78. The biasing means 65 can control and orient the respective arm members 62, 64 into a default configuration. In the embodiment, this is a straight-line orientation as depicted in FIG. 2. The biasing means can permit pivotal movement as in the direction denoted by arrow B upon the action of roller 12 relative to the surface of the associated molding 116.

The lift boom 14 also includes suitable means 68 for raising and lowering the lift boom 14 relative to the roof surface of the associated vehicle 110 as well as means for permitting the lift boom 14 to free float during at least a portion of a molding application cycle. Means 68 for raising and lowering the associated lift boom 14 can be indirectly connected to the lift boom 14. In the embodiment depicted, the means 68 for raising and lowering the lift boom 14 includes an actuator cylinder 70 operatively mounted on the support frame 112. The actuator cylinder 70 operates on a rocker arm 72 that is operatively connected to the terminal end 48 of the lift boom 14. Rocker arm 72 can project at any suitable angle relative to the central arm 46 of the lift boom 14. In the embodiment depicted the rocker arm 72 projects perpendicularly from the central arm 46 of the lift boom 14 in an orientation generally downward from the mounting bracket 50.

The means 68 for raising and lowering the lift boom 14 can also include a suitable cam follower 74 interconnected with the rocker arm 72 and the terminal end 48 of the lift boom 14. The cam follower 74 can include an associated spring (not shown) that rotates to contact the terminal end 48 of the central arm 46, lift the boom 14 and to maintain the lift boom 14 in an upper or retracted position out of contact with the roof surface of the associated vehicle 110 as at the beginning of the molding application cycle. When the lift boom 14 is lowered by the action of actuator cylinder 70, the lift boom 14 is freed from contact with the cam follower 74 and can float free in order to follow the surface contour of the roof surface of the associated vehicle 110.

The lateral force produced when the roller 12 contacts the associated molding strip 116 will overcome spring tension produced by the cam follower 74 to permit the lift boom 14 to float free allowing the roller 12 and associated lift boom 14 to follow the radius of the molding strip 116. At the end of the cycle, the actuator cylinder 70 can act on the rocker arm 72 to raise the lift boom 14, reengage the associated spring and return the lift boom 14 to that start position. In an alternate embodiment, the spring can be replaced with a rotary style spring that can biasingly maintain the lift boom 14 in the desired position.

The means 68 for raising and lowering the lift boom 14 can also include suitable dampers or bumpers positioned to prevent the lift boom 14 from slamming against the support surface 112 while the lift boom 14 is returned to the start position.

The means for permitting the lift boom 14 to free float during at least a portion of a molding application cycle can comprise the cam follower 74. In the embodiment depicted in the drawing figures the cam follower 74 is positioned in relation to the lift boom 14 and the rocker arm 72 such that, in the use position, the cam follower 74 is oriented a spaced distance away from the lift boom 14.

The lift boom 14 can also include biasing means 65 positioned in interconnected relationship between regions of the lower central arm member 62 and the upper central arm member 64 proximate to the central pivot member 60. The biasing means 65 employed are sufficient to provide sufficient force to maintain the respective lower central arm member 62 and upper central arm member 64 in aligned, straight relationship to one another when the lift boom 14 and associated roller 12 is in the raised position before and after the lift boom 14 the molding application or "wetting out" process. In the embodiment depicted, the biasing means 65 can be a suitable spring 78 connected to flange members 80, 82 located on the respective upper and lower central arm members 64, 66 coplanar with the pivotal arc defined by the central pivot member 60. The flange members 80, 82 project from the respective arm members 64, 66.

In the embodiment depicted, the spring 78 is located in opposed, preferably coplanar, relationship to the turnbuckle member 30. The spring force exerted by spring 78 is that which is necessary to hold the lower central arm member 62 and the upper central arm member 64 in position while the roller 12 is out of contact with the vehicle roof. Contacting engagement of the roller 12 with the associated vehicle roof permits the central arm member 46 to pivot about pivot angle 84 to maintain and track the roller 12 in engagement with the molding 116 as it is being applied to the roof ditch of the vehicle 110.

Multiple systems 10 can be incorporated into a suitable molding application device 100. In at least one embodiment as illustrated herein as associated with representative vehicle 110, the molding application device 100 will include at least one pair of systems 10 that are located at opposed symmetric locations on a support structure 112. The support structure 112 can be configured such that the vehicle 110 can be conveyed under or through the support structure 112 in a direction of forward travel such as that depicted at arrow 114. The support structure 112 can be integrated into an associated automotive vehicular assembly process and system either as an individual workstation or integrated to other associated workstations as required.

As one non-limiting example of an application device 100, two systems 10 are positioned on a support structure 112 in opposed symmetrical relationship with one another. The respective systems are oriented such that the rollers 12 each engage a respective molding 116 that is positioned in overlying relationship with the associated vehicle 110 for immediate application. The associated lift booms 14 are lowered from a first position to an operative position in which the roller engages the respective molding 116. In the engaged position the roller 12 contacts the upper or outwardly oriented surface of the molding 116 at its leading edge 118.

As illustrated in FIG. 4, the molding 116 and associated roof ditch has a radially oriented leading region 120 that tapers into a central region 122 in which the respective molding strip 116 are disposed in parallel relationship to one another. The trailing region 124 of the molding strips 116 is characterized by symmetrical regions having an outwardly oriented radius. The respective systems 10 each engage the leading edge 118 of an associated molding strip 116 with sufficient gravity-induced pressure to activate or "wet out" adhesive associated with the molding 116. The exact pressure value employed is can be specific to be the adhesive material employed. Certain adhesive materials will be gravity-induced pressure-activated at pressure values between about 10 and 40 lbs. In certain applications, the gravity-induced pressure will be between about 15 and 30 lbs.

One non-limiting example of an application device 100 as disclosed herein can operate in the following manner. Referring to FIG. 4, the vehicle is conveyed to a workstation location equipped with the application device 100 by any suitable mechanism such as a conveyor or the like such that a leading edge 111 of the vehicle 110 passes under support structure 112. It is to be understood that the leading edge 111 of the vehicle 110 can be either the front or rear of the vehicle 110 depending on various requirements of the assembly process. The support structure 112 or ancillary devices can also be equipped with suitable position indicating sensors and orientation devices operable on each respective application system 10 as desired or required.

The molding 116 can be oriented relative to the roof ditch prior to contact with the respective system(s) 10 by any suitable manner such that the leading edge 118 of the molding 116 registers with the leading edge of the vehicular roof ditch. The system or systems 10 are oriented and maintained in a first upper position as the vehicle approaches the support structure 112. The upper position is such that the associated roller 12 can contact and engage the leading edge 118 of the molding 116. As the vehicle 110 progresses in direction 114, the roller 12 progresses along the associated molding strip 116. The lift boom 14 is freed from the upper engaged position and is permitted to float free relative to the associated system 10. Weight 40 exerts downward force on roller 12 as it travels along the upper surface of molding 116.

The orientation of roller 12 relative to the lift boom 14 can be adjusted or set prior to contact with the leading edge 118 of the molding 116 by any suitable means such as turnbuckle 30. The angle by the orientation of the roller 12 relative to the will be the lift boom 14 will be that defined by the radius region R in the molding 116 and associated roof ditch.

Because the lift boom 14 floats freely, it can raise and lower relative to the roof of the associated vehicle 110 as the system traverses region 120 of molding 116. Wetting out pressure is exerted by gravity with force regulated by pressure transferring means 38. The system 10 can be positioned relative to support structure 112 in manner that orients the lift boom 14 and associated roller 12 at the beginning of the cycle and permits the roller to remain in contact with the molding 116 during the application or wetting out cycle. In the embodiment depicted in the various drawing figures, the systems depend from the associated support surface 112.

In addition to upward and downward travel, the boom 14 can also facilitate lateral travel of the roller 12 relative to the roof surface of vehicle 110 in order to conform to lateral contours of the roof ditch and associated molding 116. In the embodiment depicted, the lateral travel of roller 12 is accomplished by the action of upper and lower central arm members 62, 64 around central pivot member 60. Lift boom 14 can be configured with suitable spring 65 to orient the arm member 62, 64 in a generally straight configuration during transit through section 120 and 124 of the molding strip wet out cycle. As the roller 12 engages the radial surface R, tractive engagement force between the outer surface of roller 12 and the corresponding surface of the molding 116 will overcome the biasing force permitting the outer end of lift boom 14 to pivot, while maintaining contact and pressure between roller 12 and molding 116.

Once the roller 12 reaches the end of the molding 116, actuator cylinder 70 can activate to operate on rocker arm 72 to raise the lift boom to the upper position in anticipation for the next application cycle to be performed on a subsequent vehicle 110. The start command for cylinder actuation can originate from any suitable device including, but not limited to pressure feedback sensors, optical sensors, timers or the like.

The application device 100 can include a plurality of systems 10 that are each adjusted to accomplish wetting out for a given molding 116 or molding segment. Where symmetrical moldings are to be positioned on a vehicle roof as depicted in FIG. 4, it is contemplated that the application device 100 will be equipped with at least two systems 10 configured in minor image to one another; that is such that the respective rollers 12 are oriented at opposed angles relative to the respective lift boom 14. As desired or required, turnbuckle 30 and biasing means 65 can also be symmetrically oriented.

While the molding application device 100 has been described as having two symmetrically oriented systems 10, it is also within the purview of this disclosure to employ multiple systems 10 as desired or required on a single support or on a plurality of serial supports. Furthermore it is within the purview of this disclosure to employ multiple supports, each with a single system as defined within.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed:

1. A system for securing moldings to a roof ditch of a vehicle moving down an assembly line in a line of forward travel, the system comprising:
    at least one lift boom having a first end and a second end;
    at least one roller member connected to the lift boom at the first end of the lift boom, the roller member configured to engage an outwardly oriented surface of a molding positioned in the roof ditch of the vehicle;
    means for raising and lowering the lift boom in a first plane relative to a roof surface of the associated vehicle, the raising and lowering means operative on the lift boom at a location distal to the roller member;
    the at least one roller member swivelly movable in a second plane essentially perpendicular to the first plane; and
    means for permitting the lift boom to free float relative to the raising and lowering means during at least a portion of a molding application cycle.

2. The system of claim 1 further comprises at least one weight member connected to the lift boom at a location proximate to the roller member, the weight member imparting a gravity induced force to the roller member sufficient to adhere the associated molding to the roof ditch of the associated vehicle.

3. The system of claim 1 wherein the roller member has an outer axial surface configured to engage the outwardly oriented surface of the associated molding in a direct overlying manner.

4. The system of claim 1 wherein the lift boom is raised and lowered in a plane essentially perpendicular to the associated vehicle roof surface and wherein the roller member is swivelly movable relative to the lift boom in a plane essentially parallel to the associated vehicle roof surface.

5. The system of claim 4 wherein the lift boom further comprises at least one mounting member configured to be attached to a support surface, the mounting member having a coupling element, wherein the second end of the lift boom is a pivotally suspended engagement to the mounting member when the system is in a use position.

6. The system of claim 5 wherein the means for permitting the lift boom to float free relative to the raising and lowering means comprises at least one cam follower in operative engagement to the mounting member.

7. The system of claim 6 wherein the means for raising and lowering the lift boom relative to the roof surface of the associated vehicle comprises at least one actuator operative on a rocker arm engaged to the cam follower.

8. The system of claim 1 further comprising at least one pivotal travel limiter operating on the roller member, the pivot travel limiter operatively coupled to the roller member and the lift boom at a location proximate to pivotal connection.

9. The system of claim 8 wherein the pivotal travel limiter is a turnbuckle configured to adjustably orient the roller member at an acute angle relative to the line of forward travel of the vehicle.

10. The system of claim 1 wherein the lift boom comprises at least one pivotal articulation joint located medial between the first end and the second end of the lift boom, the articulation joint configured to facilitate pivotal movement of the roller member and a contiguous lift boom region relative to the line of forward travel of the associated vehicle.

11. The system of claim 10 wherein the articulation joint further comprises at least one biasing member and wherein the roller member and contiguous lift boom region pivot at an angle relative to a direction of forward travel of the vehicle in response to radial contours located in the molding and/or associated vehicle roof surface.

12. An assembly system for affixing a molding in a roof ditch of a vehicle moving down an assembly line in a direction of forward travel, the assembly system comprising:
- a support member having at least two upright supports and a central beam defining a central opening configured to overlie and surround the vehicle moving down the assembly line; and
- at least one roof ditch molding application system mounted on the support member, wherein the molding application system includes:
  - at least one lift boom having a first end and a second end;
  - at least one roller member connected to the lift boom at the first end of the lift boom, the roller member configured to engage an outwardly oriented surface of a molding positioned in the roof ditch of the vehicle;
  - means for raising and lowering the lift boom in a first plane relative to a roof surface of the associated vehicle, the raising and lowering means operative on the lift boom at location distal to the roller member,
  - the at least one roller member swivelly movable in a second plane essentially perpendicular to the first plane,
  - means for permitting the lift boom to free float relative to the raising and lowering means during at least a portion of a molding application cycle.

13. The assembly system of claim 12 further comprising at least one mounting member configured to be attached the central beam, the mounting member having a coupling element, wherein the second end of the lift boom is in pivotally suspended engagement to the mounting member when the lift boom in a use position.

14. The assembly system of claim 13 wherein the means for raising and lowering the lift boom comprises at least one rocker arm in operative engagement with the second end of the lift boom and at least one actuator mounted on the support member and coupled to the rocker arm.

15. The assembly system of claim 14 wherein the means for permitting the lift boom to free float relative to the raising and lowering means during at least a portion of a molding application cycle comprises at least one cam follower operatively engaged with the second end of the lift boom.

16. The assembly system of claim 13, wherein the assembly system further comprises:
- at least one pivotal travel limiter operating on the roller member, the pivot travel limiter operatively coupled to the roller member and the lift boom at a location proximate to pivotal connection; and
- at least one pivotal articulation joint located medial between the first end and the second end of the lift boom,
- wherein the articulation joint is configured to facilitate pivotal movement of the roller member and contiguous lift boom region relative to the line of forward travel of the associated vehicle,
- wherein the articulation joint includes at least one biasing member, and
- wherein the roller member and contiguous lift boom region pivot at an angle relative to the direction of forward travel of the vehicle in response to radial contours located in the molding and/or associated roof surface.

17. The assembly system of claim 16 wherein the lift boom further comprises at least one weight member connected to the lift boom at a location proximate to the roller member, the weight member imparting a gravity-induced force to the roller member sufficient to adhere the associated molding to the roof ditch of the associated vehicle.

* * * * *